(12) United States Patent
Matsumoto et al.

(10) Patent No.: US 6,424,493 B1
(45) Date of Patent: Jul. 23, 2002

(54) HARD DISK DRIVE MAGNETIC HEAD AIR BEARING SURFACE DESIGN FOR PREVENTING PARTICULATE CONTAMINATION THEREON

(75) Inventors: Tsuyoshi Matsumoto, Yamato; Takashi Nakamura; Atsushi Tobari, both of Fujisawa; Tatsushi Aoki, Sagamihara, all of (JP); Lee K. Dorius, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 09/606,980

(22) Filed: Jun. 29, 2000

(30) Foreign Application Priority Data

Jun. 30, 1999 (JP) .......................................... 11-186381

(51) Int. Cl.[7] .................................................. G11B 5/60
(52) U.S. Cl. ............................... 360/235.5; 360/235.6; 360/236.3; 360/235.3
(58) Field of Search ............................... 360/235.5–240

(56) References Cited

U.S. PATENT DOCUMENTS 5,777,825 A * 7/1998 Dorius ..................... 360/235.5
6,069,769 A * 5/2000 Dorius ..................... 360/235.5

* cited by examiner

*Primary Examiner*—A. J. Heinz
(74) *Attorney, Agent, or Firm*—Robert B. Martin; Bracewell & Patterson, L.L.P.

(57) ABSTRACT

A magnetic head has a left side rail formed on a disk facing surface in a protruded manner, and a right side rail formed on the disk facing surface in a protruded manner. A cross rail formed on the disk facing surface protrudes and is elongated continuously to both the left side rail and the right side rail. A left air bearing surface is formed on the disk facing surface in a protruded manner, and formed only on a side of a leading edge continuously from the left side rail. The left air bearing surface has a continuous portion to the left side rail, and a right air bearing surface which is formed on the disk facing surface in a protruded manner, formed only on a side of the leading edge continuously from the right side rail. The left air bearing surface has a continuous portion to the right side rail, wherein a recessed portion is constructed on the disk facing surface so as to be surrounded by the left side rail the left air bearing surface, the cross rail, the right air bearing surface, and the right side rail. At least part of the recessed portion produces negative pressure.

20 Claims, 9 Drawing Sheets

$$\tan \alpha = \frac{L-M}{R}$$

_US 6,424,493 B1_

HARD DISK DRIVE MAGNETIC HEAD AIR BEARING SURFACE DESIGN FOR PREVENTING PARTICULATE CONTAMINATION THEREON

TECHNICAL FIELD

Generally, the present invention relates to a hard disk drive, and in particular to a structure of a hard disk drive slider, which flies above a rotating disk and avoids adhesion and absorption of dust or the like onto a disk facing surface of the slider.

DESCRIPTION OF THE RELATED ART

A hard disk drive (HDD) uses rotating disks that are coated with a film of magnetic data recording material. Each disk is associated with at least one magnetic read/write head (magnetic head) that is supported very close to the surface of the disk. When the read/write head is moved relative to the disk, data can be read from or written on the disk.

A magnetic head has a slider including a portion from/in which data is read/written magnetically. The slider is prevented from contacting the surface of the magnetic disk by an air cushion produced by the rotating disk adjacent to the disk facing surface of the slider. While the disk is rotating, particles are apt to gather and stick to the disk facing surface of the slider. If such particles fall on the disk, which is facing the slider, they will physically scratch the surface of the disk. To avoid such a problem, the slider must be configured to prevent such contamination.

Under such circumstances, it is an object of the present invention to provide a slider to fly above a rotating disk so as to prevent the disk facing surface of the slider from particulate contamination.

SUMMARY OF THE INVENTION

An object of the present invention, as described above, will be achieved by a magnetic head which is characterized as follows. The magnetic head has a left side rail (140, 240) formed on a disk facing surface (100, 200) in a protruded manner, and a right side rail (150, 250) formed on the disk facing surface (100, 200) in a protruded manner. A cross rail (110, 210) formed on the disk facing surface (100, 200) also protrudes and is elongated continuously to both the left side rail (140, 240) and the right side rail (150, 250).

A left air bearing surface (120, 220) is formed on the disk facing surface (100, 200) in a protruded manner, and formed only on a side of a leading edge (102, 202) continuously from the left side rail. The left air bearing surface (120, 220) has a continuous portion (124, 225) to the left side rail, and a right air bearing surface (130, 230) which is formed on the disk facing surface (100, 200) in a protruded manner, formed only on a side of the leading edge (102, 202) continuously from the right side rail. In addition, left air bearing surface (120, 220) has a continuous portion (134, 235) to the right side rail, wherein a recessed portion (190, 290) is constructed on the disk facing surface so as to be surrounded by the left side rail (140, 240), the left air bearing surface (120, 220), the cross rail (110, 210), the right air bearing surface (130, 230), and the right side rail (150, 250). At least part of the recessed portion can produce negative pressure. And furthermore, a degree of the protrusion of the left side rail (140, 240) or the right side rail (150, 250) is larger than a degree of the protrusion of the recessed portion (190, 290), but smaller than a degree of the protrusion of the left air bearing surface (120, 220) or the right air bearing surface (130, 230).

DESCRIPTION OF THE PREFERRED EMBODIMENT

Figure 1:
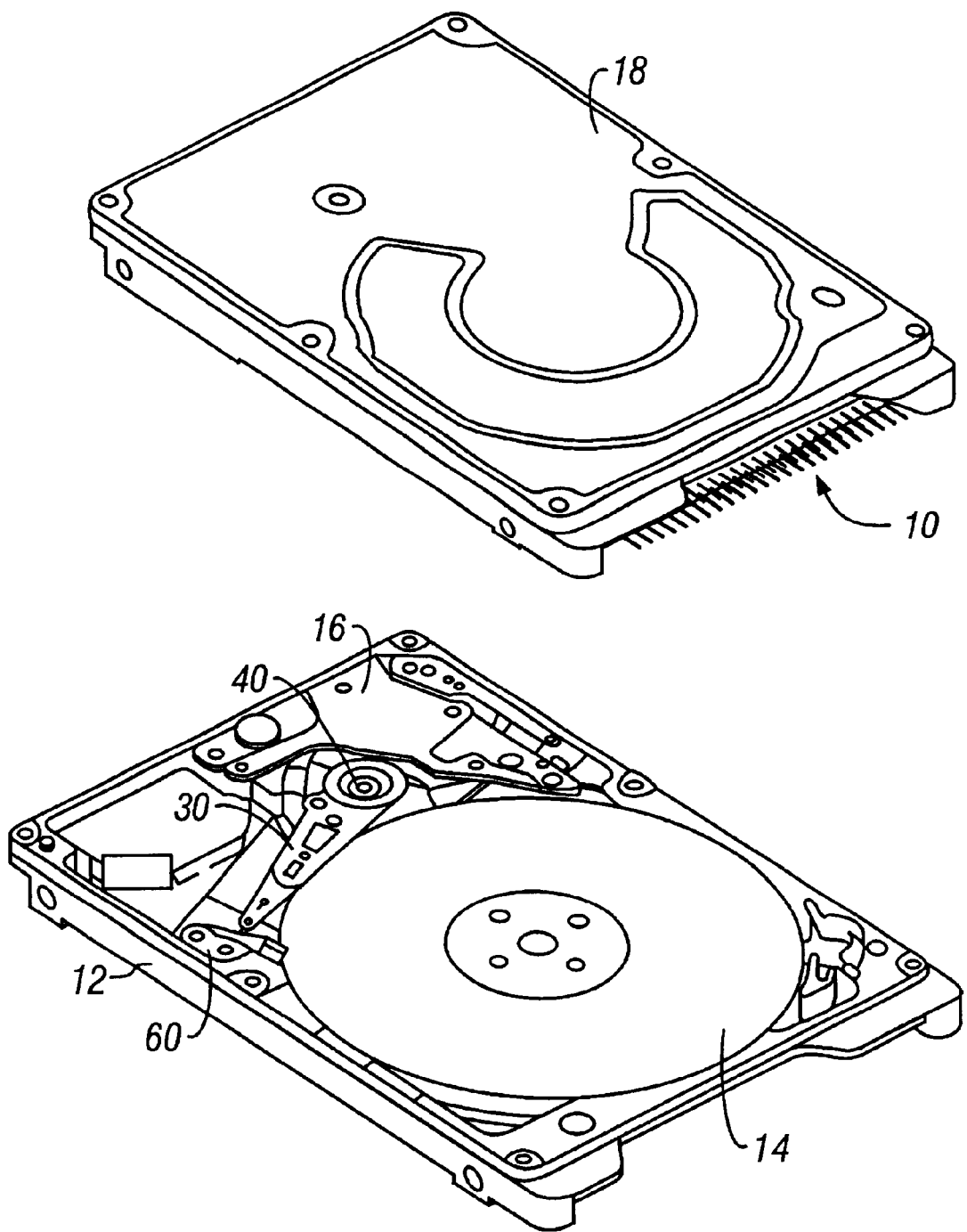
FIG. 1 shows upper and lower perspective views of a hard disk drive (HDD) 10.

FIG. 1 is perspective views (upper and lower) of a hard disk drive (HDD) 10. A cover 18 is removed in the lower perspective view so as to show the inside of the hard disk drive 10. A disk 14 is rotationally attached to a base 12. A head suspension assembly (HSA) 30 is also attached to the base 12, so that the head suspension assembly 30, crossing the disk 14 in the radial direction, can access a desirable position on the disk 14.

Figure 2A:
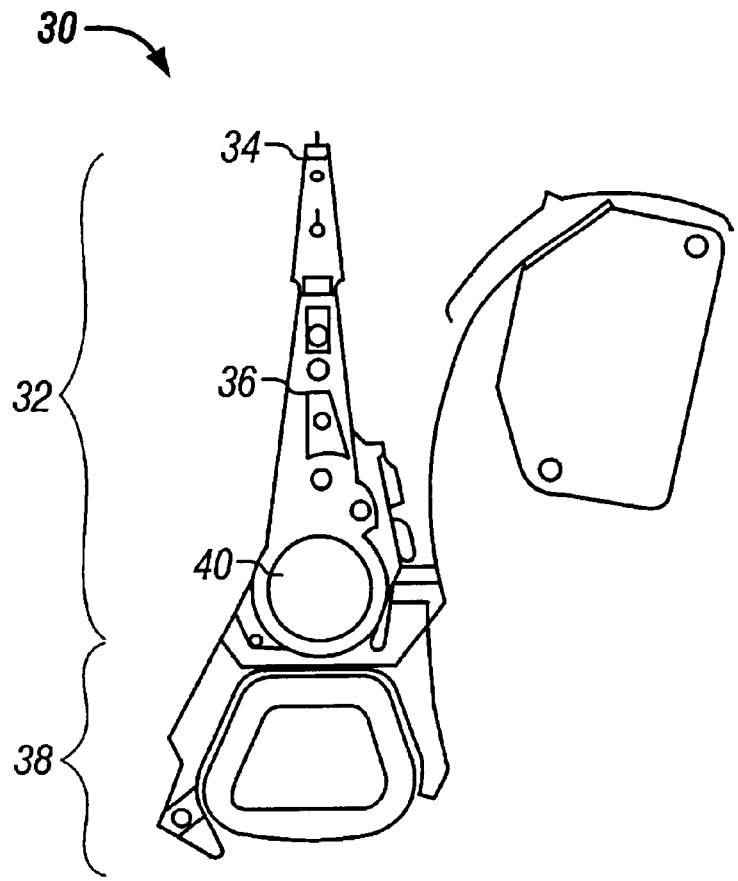
FIGS. 2(A) and (B) are top and perspective views of a head suspension assembly (HSA) 30.
Figure 2B:
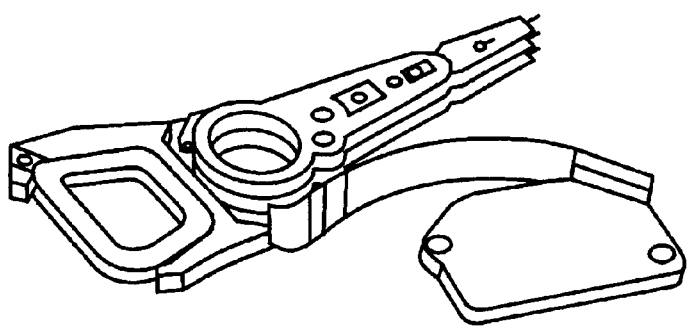

FIG. 2 shows a top view (A) and a perspective view (B) of the head suspension assembly (HSA) 30. The head suspension assembly (HSA) 30 includes a head gimbal assembly (HGA) 32 and a coil support 38. The head gimbal assembly (HGA) 32 is fixed to the coil support 38 and both items 32 and 38 are rockingly attached to the base 12 around a shaft 40 (FIG. 1). If a current is applied to the coil portion of the coil support 38, the coil support 38, in cooperation with a magnetic field given by a voice coil motor (VCM) assembly 16 (FIG. 1), causes the HSA 30 to rock, thereby the head suspension assembly (HSA) 30 can access a desirable position on the disk 14.

A magnetic head 34 is attached to the tip of the suspension 36 which composes the head gimbal assembly (HGA) 32.

Data is read from/written on the disk 14 through this magnetic head 34. It is important that the magnetic head 34 does not come in contact with the surface of the disk 14 when the disk 14 is not rotating. It is also important to construct the structure of the hard disk drive so that after the hard disk drive is started up, the magnetic head 34 is kept away from the surface of the disk 14 until the disk 14 reaches a rotation speed enough to form an air cushion on the disk facing surface of the magnetic head 34.

Loading and Unloading (L/UL)

For such reasons, some hard disk drives (HDD) 10 employ a loading/unloading ramp structure 60, which keeps the magnetic head 34 away from the surface of the disk 14 when the disk 14 is not rotating. When the magnetic disk 14 reaches a predetermined rotation speed, the magnetic head 34 is released from the ramp structure 60. FIG. 1 shows the magnetic head 34, which is not released from the ramp structure 60 yet.

Figure 3:
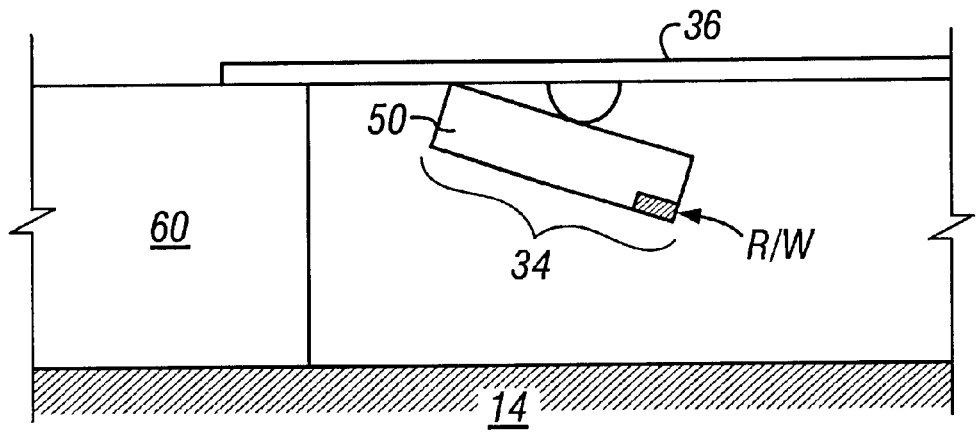
FIG. 3 is an enlarged side view of the tip of a suspension 36 drawn back and supported on a ramp structure 60, and the magnetic head 34 kept released from the surface of the disk 14.

FIG. 3 shows an expanded view of the magnetic disk 34 kept away from the surface of the disk 14 while the tip of the suspension 36 is drawn back and held on the ramp structure 60. The slider 50 is part of the magnetic head 34. The slider 50 to fly above the disk 14 has a disk facing surface. A portion of the disk facing surface of the slider 50, which is used for reading data from/writing data on the disk 14, is usually smaller for the area of the slider 50. The portion is equivalent to the R/W region shown in FIG. 3. R indicates a portion for reading. For example, an MR read head or a GMR read head, which makes the use of a magnetic resistance effect, is used as the portion for reading. W indicates a portion for writing. For example, a write transducer is used as this portion for writing. The R and W portions are usually formed together in the manufacturing process of sliders.

Negative Pressure Slider

The slider 50 is of the negative pressure variety. Such a negative pressure slider keeps the balance of the slider in levitation by making the use of positive and negative pressures to be produced between the slider 50 and the disk 14. Those positive and negative pressures depend on the circumferential speed of the disk 14 respectively. However, since the disk makes almost no difference in levitation height between the inner and outer peripheries, they are said to have an advantage for flying the disk low. In other words, negative pressure makes it easy to control the variation of the levitation height. In addition, such a negative pressure slider can reduce the change of the levitation height even at such low pressure place as a highland. Negative pressure means a portion with a lower pressure than that of the surroundings and it is a portion with lower pressure than one atmosphere when the atmospheric pressure is a standard.

Upper, Middle, and Lower Stages

Figure 4:
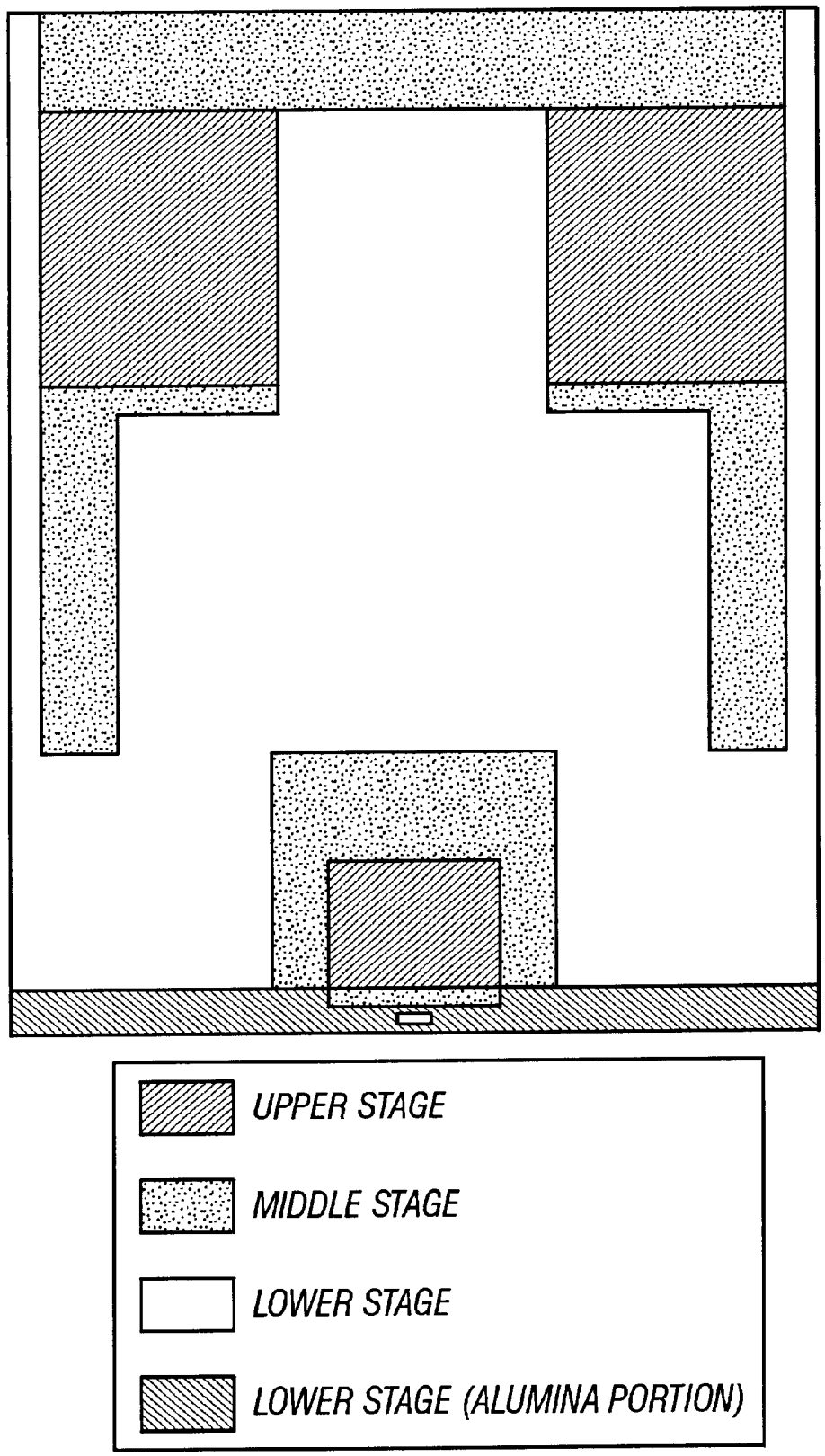
FIG. 4 is a block diagram of a negative pressure slider associated with the present invention, comprising upper, middle, and lower stages.

FIG. 4 shows a configuration of each of the upper, middle, and lower stages, which are provided in a typical negative pressure slider associated with the present invention. The entire surface shown in FIG. 4 has come to face a rotating disk 14. This negative pressure slider has a flat surface of three stages referred to as the upper, middle, and lower stages. Note that, however, a flat surface mentioned here is not always a surface at a level with the paper surface on which FIG. 4 is described. The upper and middle stages, when seeing from the lower stage, are formed in a protruded manner respectively. However, in an actual process for forming the slider, the upper stage is usually formed by etching, etc. as a datum plane, which is then followed by the middle stage and the lower stage.

Figure 5:
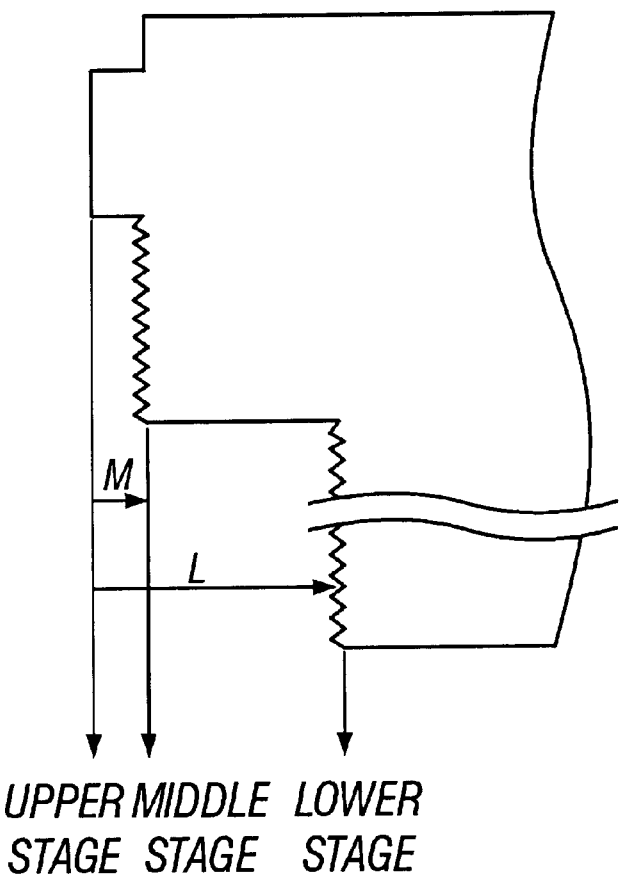
FIG. 5 is a schematic side view of both M, a depth to the middle stage, and L, a depth to the lower stage when the upper stage is defined as a datum plane.

FIG. 5 shows an explanatory view indicating a depth M reaching the middle stage and a depth L reaching the lower stage in a case where the upper stage is defined as a datum plane. As the surface of the slider is etched deeper in processes including etching, etc., a physical reaction to the surface is also increased. Thus, the surface tends to become rough increasingly. However, depending on how the slider flies above the disk, it will not be a matter however the etched surface becomes rough.

ABS

The upper stage, which is defined as a datum plane, is referred to as an air bearing surface (ABS). It is also referred to as a pad. Since this ABS is the closest portion of the disk facing surface to the disk 14, this ABS produces most of the positive pressure for causing the slider 50 to fly. How such an ABS is disposed on the disk facing surface affects how the slider flies above the disk significantly. In addition, the rough surface of the ABS is also very effective to stabilize the smooth air flow on the disk facing surface. This is why the surface of the ABS is usually finished like a mirror.

Relationship Between Depth to Reach Each Stage and Negative Pressure

Figure 9:
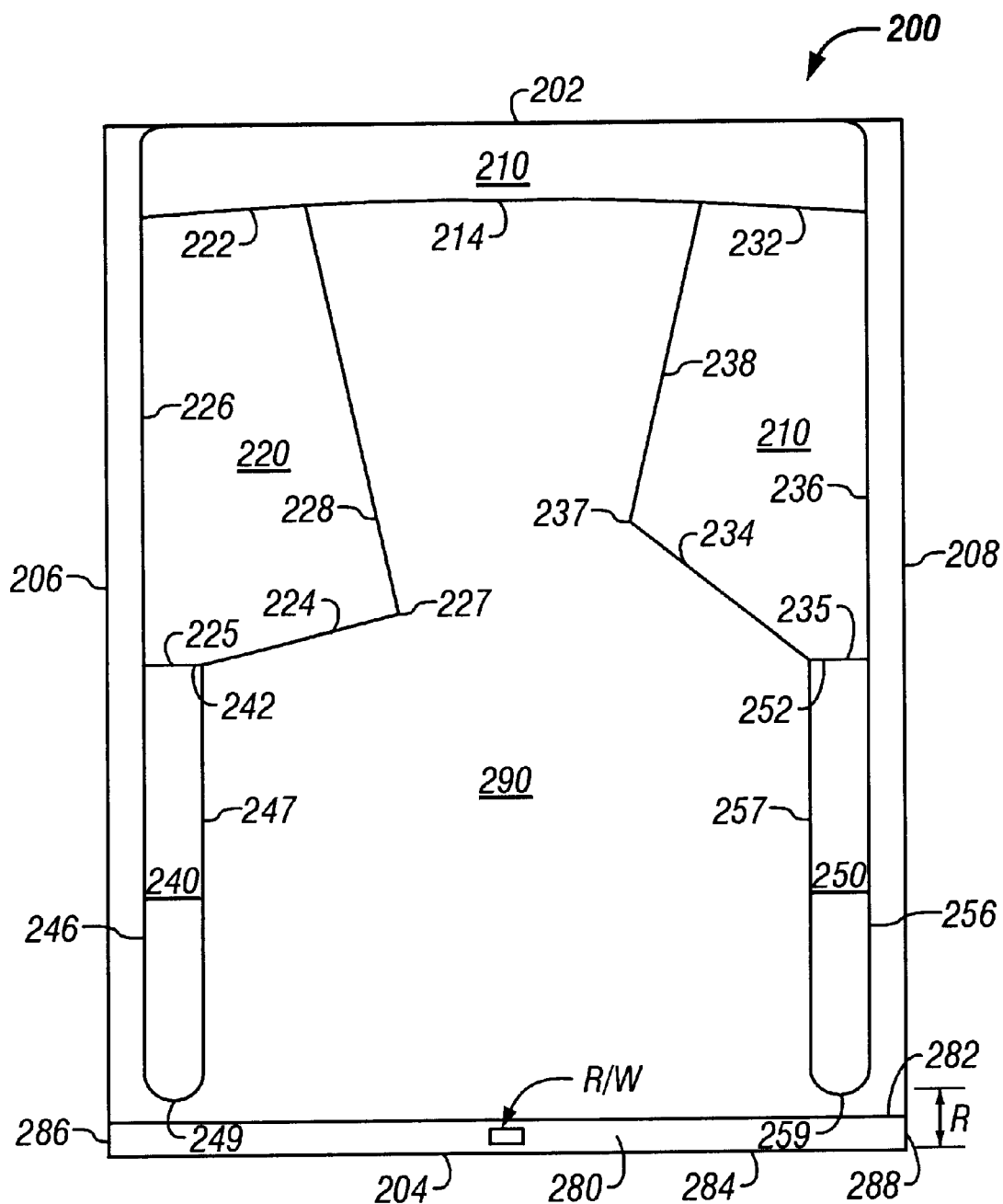
FIG. 9 is a top view of a structure of the disk facing surface 200 of another version of a negative pressure slider of the present invention.

In order to produce negative pressure effectively, it is very important how much a depth M is given to reach the middle stage, as well as a depth L to reach the lower stage from the ABS, which is the upper stage and a datum plane. In this embodiment, when L was set to 10 $\mu$m for a negative pressure slider (about 1.2 mm by 1 mm) as shown in FIGS. 4 and 9, the ABS did not function as a pocket for producing negative pressure effectively. On the other hand, it was found that L= about 1 to 5 $\mu$m was very effective for producing negative pressure. And, when L was set much shallower than 1 $\mu$m, however, the effective area itself for producing negative pressure was reduced, thus the ABS became meaningless. In other words, when the balance between positive and negative pressures was taken in consideration, the result became as follows; the ABS functioned enough as a pocket for producing negative pressure at about L=1 $\mu$m, but not function enough at about L<1 $\mu$m.

It was also found that the ABS performance for producing positive pressure was degraded significantly at a portion set to M<1 $\mu$m, which was very shallow from the ABS defined as a datum plane. Consequently, it was found that the M<1 $\mu$m portion could be disposed comparatively free without affecting the levitation of the slider. In experimental consideration of M<1 $\mu$m, it was found that setting M greater than or equal to 80 nm as a depth for reaching the middle stage M was possible to lower the ABS performance for producing positive pressure.

Basic Configuration of a Negative Pressure Slider

Figure 6:
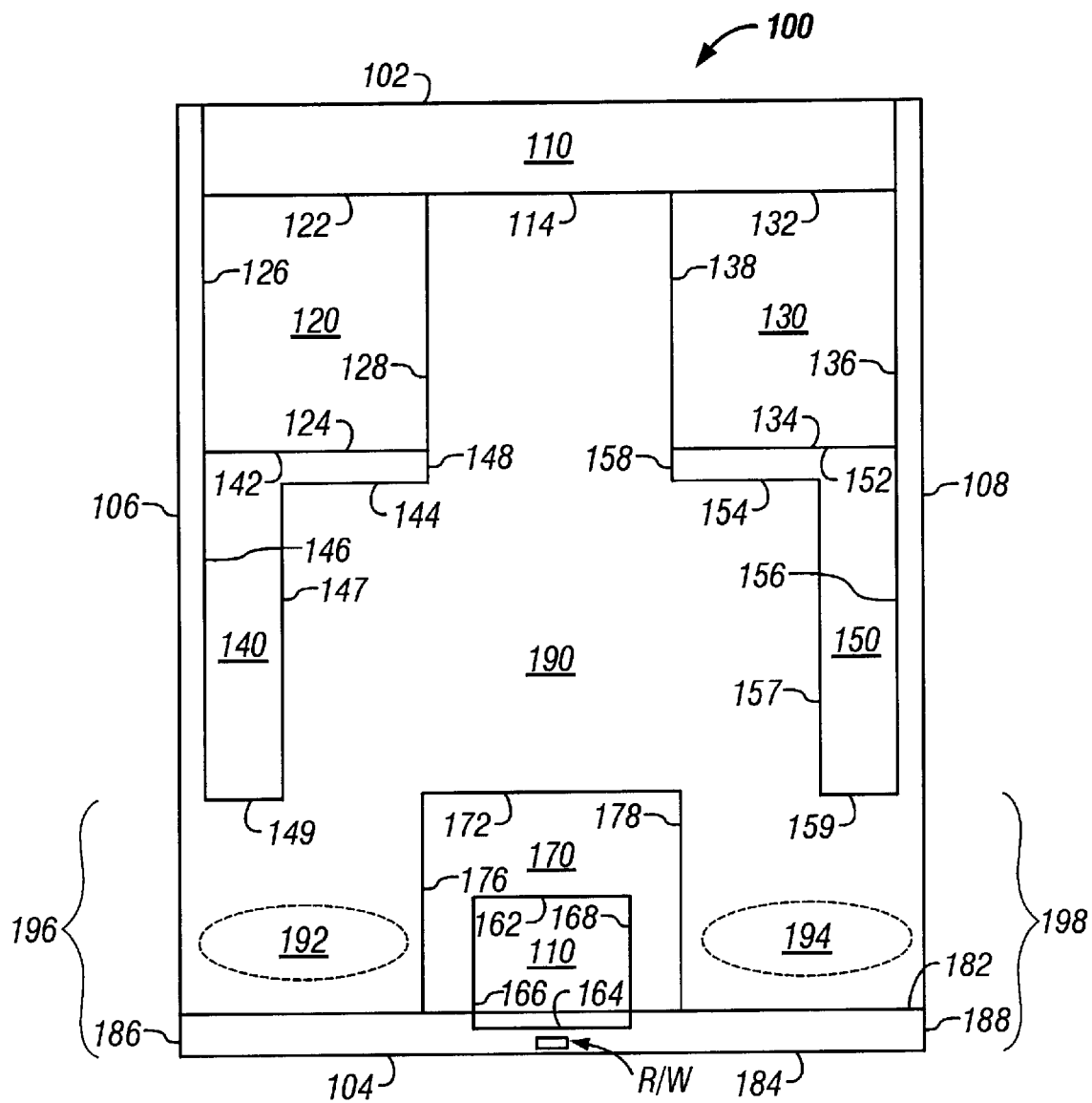
FIG. 6 is a top view of a detailed configuration of the disk facing surface 100 of a negative pressure slider associated with the present invention.

FIG. 6 shows a top view of a detailed configuration for the disk facing surface 100 of a negative pressure slider associated with the present invention. The name of each part of the disk facing surface 100 is as shown below. The description of the island portion is omitted here, however.

The left air bearing surface 120, the cross rail 110, and the right air bearing surface 130 formed on the disk facing surface 100 respectively in a protruded manner are combined to achieve the basic function for producing negative pressure in the negative pressure slider. Most of the negative pressure is produced at a portion connected to the recessed portion 190 from the trailing edge 114 of the cross rail 110 when part of the air from the leading edge 102 of the disk facing surface is blocked by the cross rail 110. More precisely, the negative pressure is produced at a portion of the recessed portion 190, surrounded by the left air bearing surface 120, the cross rail 110, and the right air bearing surface 130, more precisely at least at part of the surrounded portion.

Problems with the Negative Pressure Producing Portion

The negative pressure producing portion of the recessed portion 190 tends to gather particles, since it is lower in pressure than other surrounding portions. In addition, as described above, unlike the mirror-finished ABS, the surface of the recessed portion 190 is often rough. This is why particles are gathered, stuck, and absorbed on the surface of the negative pressure producing portion.

Such particles look like being sprayed or gaseous there. Those particles, when stuck on the surface of the slider, look like a fluid. Any particles tend to be caught in the uneven surface in the lower stage of the slider 50, then stuck or absorbed and accumulated there. The particles mentioned here include not only cuttings and chips from the alumina portion to be described layer, as well as those floating freely in the HDD. Such particles stuck on the slider 50 fall on the disk 14 sometimes. And furthermore, the sizes of those particles are larger than the levitation height of the disk 14 from the R/W portion of the magnetic head 34 (FIG. 3), thereby causing the magnetic head 34 to crash against the disk 14. For example, the levitation height of the disk 14 from the R/W portion of the magnetic head 34 (FIG. 3) is often about 100 nm or under. Principally, particles of L=1 μm (1000 nm) or under in size (depth) are stuck or absorbed at the recessed portion 190. Such particles, when falling on the disk 14, will cause a fatal damage to the magnetic head 34 or the like.

Such a crash of the magnetic head 34 against the disk 14 will thus scratch the surface of the disk 14 physically. And, even when a fatal damage is avoided, such a crash might erase, for example, the information written on the disk magnetically due to the friction. This error will then bring a deathblow to the reliability of the hard disk drive (HDD).

Alumina Portion

Return to FIG. 6. In some cases, the trailing edge 104 of the disk facing surface 100 has a fixed portion along the leading edge. The portion is an alumina portion 180 formed with a material (ex., alumina: $Al_2O_3$) different from the material of the slider (ex., AlTiC). This alumina portion 180 is used to form the R/W portion (FIG. 4). The alumina portion is often created in parallel to the portion between the leading edge 182 and the trailing edge 184 (equivalent to the trailing edge 104 of the disk facing surface) thereof for the reason of the manufacturing process. Alumina, whose stiffness is weaker than that of AlTiC, tends to be scraped away and chipped easily.

Flow Lines (Influence by the Length of Each Side Rail)

Figure 7:
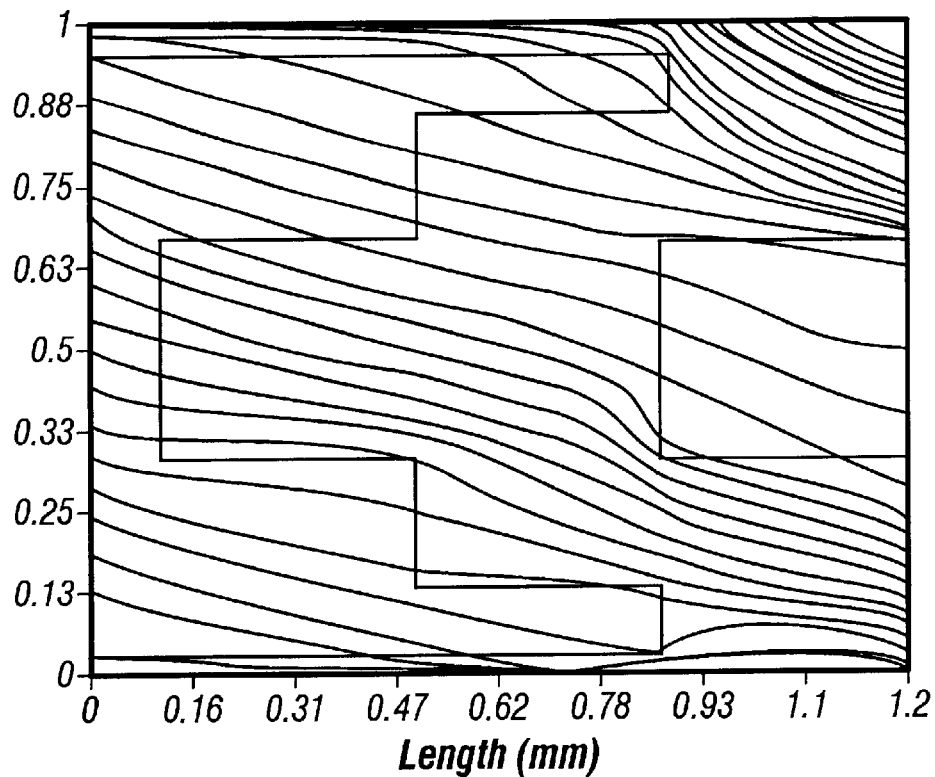
FIG. 7 shows flow lines obtained as a result of simulation for flying the negative pressure slider associated with the present invention shown in FIG. 4.

FIG. 7 shows flow lines obtained as a result of simulation for flying the negative pressure slider associated with the present invention shown in FIG. 4. The rotation speed of the disk 14 is 4200 rpm. The ideal air flow on the disk facing surface 100 is a flow at right angles to the leading edge 102 of the disk facing surface. Actually, however, an angle referred to as a skew angle is generated between the ideal air inflow and the actual air inflow. This is because the air inflow angle differs between accessing of the outer periphery and accessing of the inner periphery of the disk 14, since the HSA 30 is rocking around the shaft 40. Such a skew angle is decided by the center of the disk 14 loaded in the HDD 10 and the rotational center of the head (actuator). In this simulation, the skew angle S is assumed to be S=+15°.

It should be understood from FIG. 7 that flow lines are concentrated in the right lower area 194 of the recessed portion. And, it is found that many particles are actually stuck or absorbed in this area 194. Since no negative pressure is produced here, there must be any other reasons for causing those particles to be stuck or absorbed here.

Figure 8:
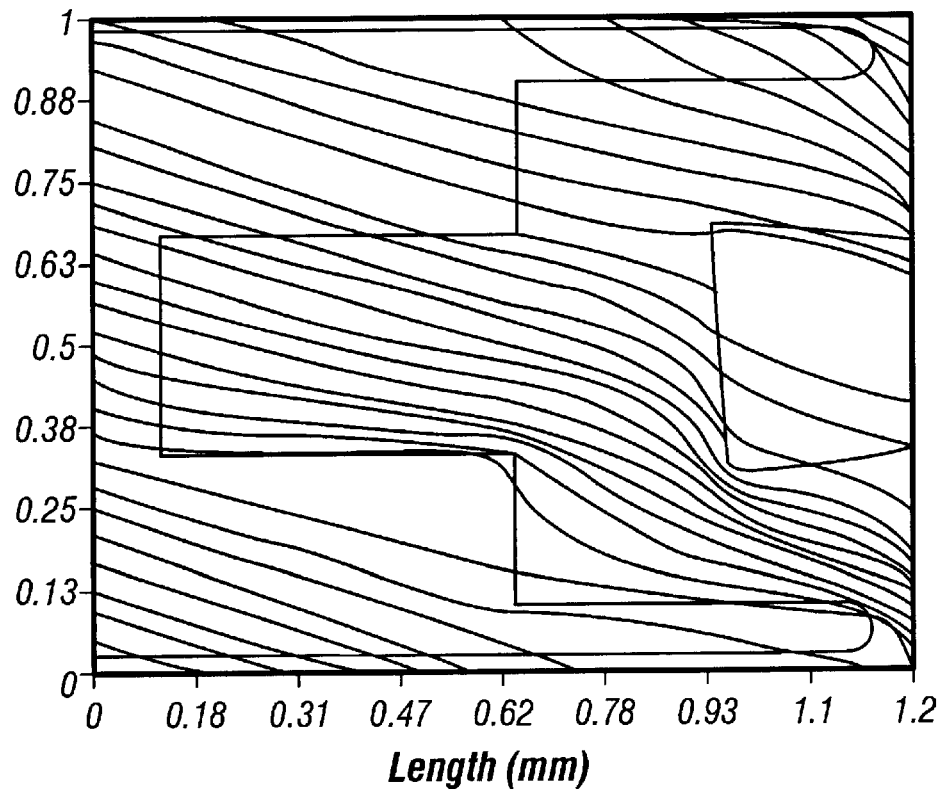
FIG. 8 shows flow lines obtained as a result of simulation for flying the negative pressure slider of the present invention (This negative pressure slider is characterized in that the terminal edge 159 of the right side rail is extended up to around the front of the trailing edge 104 of the disk facing surface)

FIG. 8 shows flow lines obtained as a result of simulation for flying the negative pressure slider of the present invention. This negative pressure slider is characterized in that the terminal edge 159 of the right side rail is extended up to around the front of the training edge 104 of the disk facing surface. Although many flow lines are seen in the right lower area 194 of the recessed portion in FIG. 7, the fact that most of those flow lines have disappeared from there can be seen in FIG. 8. In addition, FIG. 7 also shows that flow lines are pulled towards the center of the disk facing surface 100 (as if they are sucked there). And, FIG. 8 shows how those flow lines are suppressed there.

It should also be understood that the air flow is pulled by the produced negative pressure, thereby it is prevented from being swallowed up there, since the terminal edge 159 of the right side rail is extended practically up to around the front of the trailing edge 104 of the disk facing surface. "Front" mentioned here means a direction toward the leading edge 102 from the trailing edge 104. And, "practically" means "such an effect can be expected to some extent". Negative pressure, as described above, is generated, at least at part of the recessed portion 190, surrounded by the left side rail 140, the left air bearing surface 120, the cross rail 110, the right air bearing surface 130, and the right side rail 150.

The effect of the extended terminal edge 159 of the right side rail appeared when the skew angle was set to S=+15°. Consequently, the same effect will also be obtained from the extended terminal edge 149 of the left side rail when the skew angle is set S=−15°. It is easy to estimate such an effect in this case. In other words, if the positional relationship between the center of the disk 14 and the rotational center of the head (actuator) in the HDD 10 is set so as to set the skew angle to either of the plus and minus sides, it is only needed to extend only one of the left side rail 140 and the right side rail 150.

Effect of Protruded Side Rails

The left and right side rails 140 and 150 can function as guides for rectifying the air flow and walls for blocking the air flow from the negative pressure producing portion. In this case, however, either of the left side rail 140 or the right side rail 150 must be protruded from the recessed portion 190. Taking such a function of the left/right side rail as a guide into account, a depth of M<1 μm was examined again, and it was found that setting of an upper limit (a lower limit for a degree of protrusion) of M less than or equal to 300 nm will obtain such an effect satisfactorily. It means a depth reaching the middle stage. In other words, the optimized range of M<1 μm was found to be M greater than or equal to 80 nm, but less than or equal to 300 nm as a result of the combination with M greater than or equal to 80 nm, which was found in the above step.

ABS Continued to Both Side Rails

Side rails themselves must be continued to each other so as to function as a wall. Those side rails must also be continued to the ABS to form such a wall. "Continued to" means that there is no portion of a depth M or over, which reaches the middle stage, between those side rails and the ABS. In other words, there is no such portion as a depth L in the portion continued to the lower stage. For example, the trailing edge 124 of the left ABS 120 forms a portion continued to the leading edge 142 of the left side rail 140. And, the trailing edge 134 of the right ABS 130 forms a portion continued to the leading edge 152 of the right side rail 150.

Another Version of the Negative Pressure Slider

FIG. 9 shows a top view of a structure of the disk facing surface 200 of another negative pressure slider of the present invention. The name of each part of the slider's disk facing surface 200 is indicated with a symbol as shown below. This negative pressure slider employs the values of M=180 nm and L=1 µm. In FIG. 9, the symbols 200s are used for items corresponding to the same items shown in FIG. 8 as the disk facing surface 200 of another negative pressure slider of the present invention in FIG. 9 almost corresponds to the disk facing surface 100 of the negative pressure slider in FIG. 8. Note that, however, such edges as 222, 224, 228, 232, 234, 236, and 238 are not always in parallel nor right angles to the leading edge 202 and the right edge 208 of the disk facing surface and the terminal edge 249 of the left side rail and the terminal edge 259 of the right side rail are not always formed linearly respectively in FIG. 9.

Figure 10:
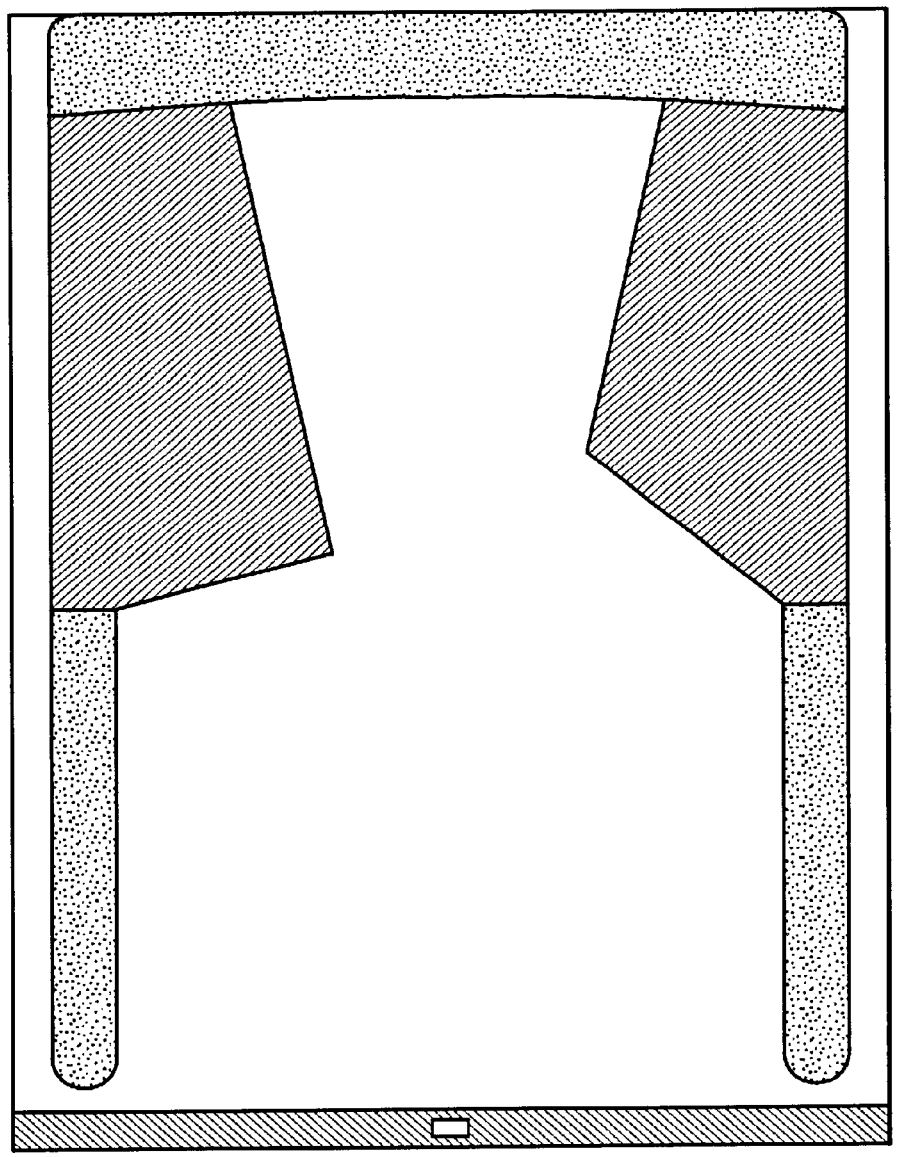
FIG. 10 is a block diagram of another version of a negative pressure slider of the present invention, which includes upper, middle, and lower stages similarly to FIG. 4.

FIG. 10 shows a configuration of each of the upper, middle, and lower stages provided in another negative pressure slider of the present invention, just like in FIG. 4.

Changes of the Slider Position When in Loading

Figure 11A:
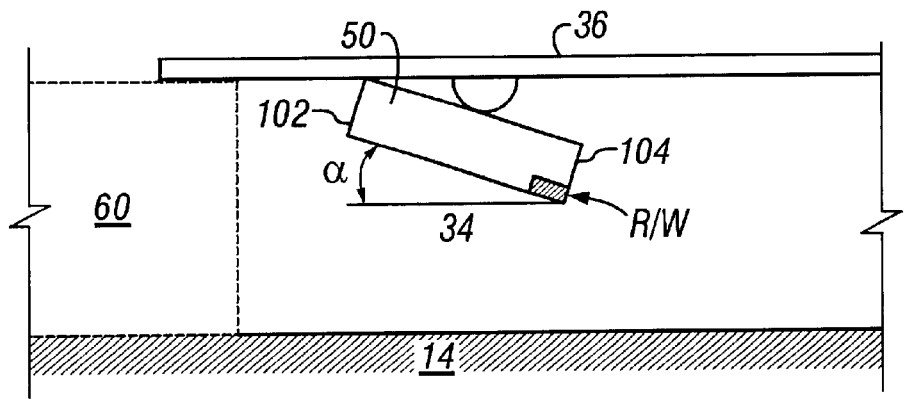
FIG. 11 schematically illustrates attachment of magnetic head 34 (or slider 50) to the tip of the suspension 36 (a) when it is loaded and how the head 34 is fly above a magnetic disk 14, and, (b) when it is stabilized.
Figure 11B:
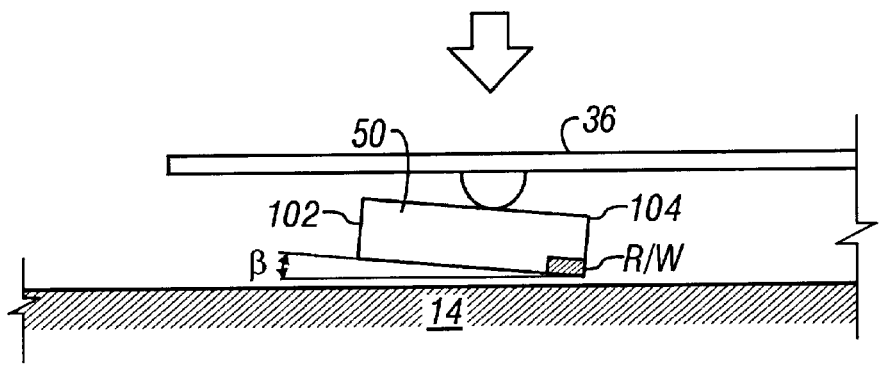

FIG. 11(a) shows a position of the magnetic head 34 (or the slider 50) attached to the tip of the suspension 36 when the head 34 is loaded and FIG. 11(b) shows a position of the magnetic head 34 (or the slider 50) in levitation above the magnetic disk 14 when the head 34 is stabilized. As described with reference to FIG. 3, if the unloaded magnetic head 34 is loaded again onto the disk 14, the magnetic head 34 is not supported by the ramp structure 60 (dotted line). Then, the magnetic head 34 is released from the ramp structure 60 and goes down onto the disk 14. At this time, it is also possible to bring the magnetic disk 34 close to the disk 14 making the use of a biasing force produced by the suspension 36.

A significant difference exists in the position of the magnetic head 34 between when it is attached to the tip of the suspension 36 when it is loaded as shown in (a) and when it is flied above the magnetic disk 14 when it is stabilized as shown in (b) and fly above the magnetic disk 14. This is because the magnetic head 34 is stabilized as shown in (b) only when the biasing force produced by the suspension is balanced with the flying force (including a negative pressure) received by the magnetic head 34 from an air flow of the disk 14.

Consequently, the magnetic head 34 (or the slider 50) comes in contact physically with the disk 14 when the magnetic head 34 (or the slider 50) changes its position even in a moment in the process from (a) loading to (b) stabilizing. Especially, such a physical contact is associated with pitch angles alpha and beta significantly. In other words, the leading edge 102 of the disk facing surface does not come in contact with the disk 14 so easily, but comes in contact with the trailing edge 104 of the disk facing surface easily, especially comes in contact with the disk 14 around the R/W portion more easily.

The pitch angle becomes alpha=20 to 30 min or so when in loading as shown in (a). It is not rare that the pitch angle alpha becomes 1° (60 min). On the other hand, when the magnetic head 34 is stabilized as shown in (b), the pitch angle beta is only about several tens of microradians (rad). In other words, if the magnetic head 34 is frequently fallen on the disk 14 when in loading as shown in (a), the R/W alumina portion (180, 280), which is weak in stiffness, is scraped and chipped, although it is not so usual. A small amount of fine alumina particles are thus produced.

If the slider 50 rolls (both left and right side rails are rocking like a seesaw while in rotation) while it is fly, the terminal edge 149 of the left side rail, or the terminal edge 159 (in FIG. 6) of the right side rail, or the terminal edge 249 of the left side rail, or the terminal edge 259 (in FIG. 9) of the right side rail comes in contact with the disk 14 sometimes. The magnetic head 34 also rolls when the skew angle S to be described later is changed when the disk 14 is accessed.

In FIG. 9, the reason why the terminal edge 249 of the left side rail or the terminal edge 259 of the right side rail (the terminal edge 149 (FIG. 6) of the left side rail or the terminal edge 159 (FIG. 6) of the right side rail) is not formed linearly, but rounded with R is to provide each corner (a peak at which three planes cross each other) of the alumina portion (180, 280), which is weak in stiffness, with an effect for avoiding a direct contact with the disk 14. "Each corner" (a peak at which three planes cross each other) of the alumina portion (180, 280) means a ridge line between the left edge (186, 286) or the right edge (188, 288) of the alumina portion and the trailing edge (184, 284) of the alumina portion, as well as a point of intersection of those edges and the disk facing surface (100, 200).

Position Change When in Unloading

The position of the magnetic head during unloading, as shown in FIG. 3, from the stabilized status was also examined. When the magnetic head 34 is stabilized as shown in (b), the head 34 tends to stick forcibly to the surface of the disk 14, thus the head 34 must be released from the disk 14 with a larger force. When the head 34 begins leaving from the surface of the disk 14, the negative pressure of the head is reduced suddenly at once at a point of time; it is not changed in a continuous manner.

And, such a sudden reduction loses the balance with the biasing force of the suspension 36, which has been applied to the head when it is stable, thereby causing the head 34 to take a jump-like action. Since a larger force is needed to release the head 34 from the disk 14, the jump-like force also becomes large. In such a sudden change of the position, even in a moment, the magnetic head 34 (or the slider 50) is driven in a physical contact with the disk 14.

ABS is not Provided at Trailing Edge of Each Side Rail

In the slider associated with the present invention, the ABS continued to both side rails is provided only at the leading edge respectively; it is not provided at the trailing edge. This is because a problem arises if the ABS is continued to both side rails is provided at the trailing edge. In other words, the ABS is the most protruded datum plane. Such an ABS comes in contact with the disk 14 first when the slider rolls, for example. Such a contact must be avoided. In addition, if any portion of the ABS is scraped due to such a contact with the disk 14, the ABS function is degraded due to the reduction of the ABS area scraped off, even when the reduction is very small, thereby affecting the levitation of the magnetic head very badly.

On the other hand, when only a side rail in the middle stage comes in contact with the disk 14, such a problem never arises. In order to avoid such a problem, therefore, it is only needed to compose the side rail in the middle stage positively so as to come in contact with the disk 14 when the slider rolls.

Figure 12:
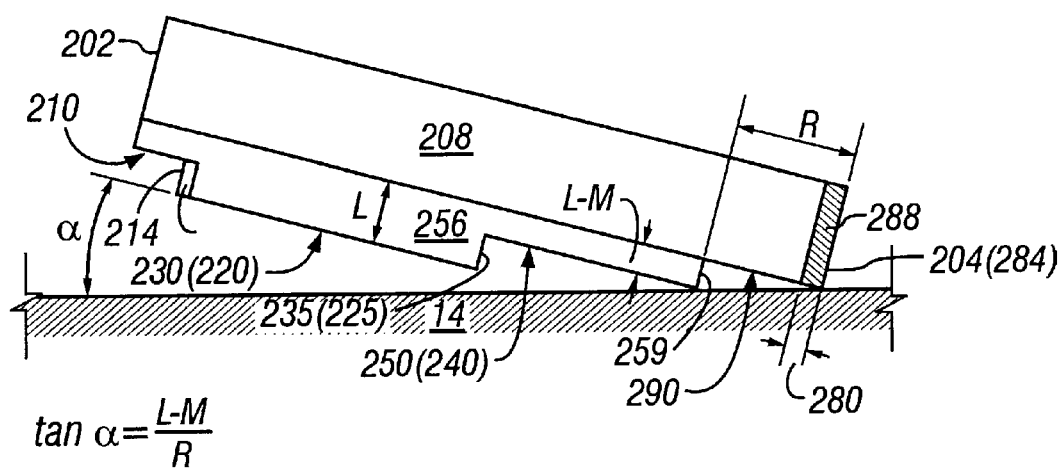
FIG. 12 is a side view of the slider 50 in contact with the surface of disk 14 at a pitch angle alpha.

FIG. 12 shows a side view of the slider 50 indicating the relationship between a pitch angle alpha of the slider 50 and a contact of the slider 50 with the disk 14. FIG. 12 shows a geometrical relationship between the ridge line of the terminal edge 259 of the right side rail (or the terminal edge 249 of the left side rail) and the ridge line of the trailing edge 204, when both ridge lines come in contact with the surface of the disk 14 at the same time on a line connecting both of the ridge lines. If the pitch angle is alpha, the geometrical relationship is represented as tan alpha=(L−M)/R. The R is a distance between the trailing edge 204 and the ridge line of the terminal edge 259 of the right side rail (or the terminal edge 249 of the left side rail) along the disk facing surface (FIG. 9). The L–M is a depth between the middle stage and the lower stage, which means a degree of a protrusion obtained by subtracting the depth M reaching the middle stage from the depth L reaching the lower stage. The distance is vertical to the disk facing surface.

In other words, it is possible to make the terminal edge 259 of the right side rail (or the terminal edge 249 of the left side rail) come in contact directly with the disk 14 before the trailing edge 204 comes in contact with the disk 14, by estimating the pitch angle alpha of the slider 50, for example, when in loading as shown in FIG. 11(a). It is decided by such a geometrical relationship where to dispose the terminal edge 259 of the right side rail (or the terminal edge 249 of the left side rail) in front of the trailing edge 204.

As described above, it should be avoided to use alumina, which is scraped easily, as a material of the terminal edge 259 of the right side rail (or the terminal edge 249 of the left side rail). The (leading edge 282) of the alumina portion 280, however, can be formed within the range of R in maximum.

According to the present invention, it is possible to provide a structure of a slider, which flies above a rotating disk, so that its disk facing surface is protected from contamination by particles.

What is claimed is:

1. A magnetic head, comprising:
   a disk facing surface;
   a left side rail (140, 240) formed on the disk facing surface (100, 200) in a protruded manner;
   a right side rail (150, 250) formed on the disk facing surface (100, 200) in a protruded manner;
   a cross rail (110, 210) formed on the disk facing surface (100, 200) in a protruded manner and elongated continuously to both the left side rail (140, 240) and the right side rail (150, 250);
   a left air bearing surface (120, 220) formed on the disk facing surface (100, 200) in a protruded manner and formed only on a side of a leading edge (102, 202) continuously from the left side rail, the left air bearing surface (120, 220) having a continuous portion (124, 225) to the left side rail;
   a right air bearing surface (130, 230) formed on the disk facing surface (100, 200) in a protruded manner and formed only on a side of a leading edge (102, 202) continuously from the right side rail, the right air bearing surface (130, 230) having a continuous portion (134, 235) to the right side rail; wherein
   a recessed portion (190, 290) is constructed so as to be surrounded by the left side rail (140, 240), the left air bearing surface (120, 220), the cross rail (110, 210), the right air bearing surface (130, 230), and the right side rail (150, 250), and at least one part of the recessed portion produces negative pressure; and wherein
   one of the left side rail (140, 240) and the right side rail (150, 250) protrude beyond the recessed portion (190, 290), and protrude less than one of the left air bearing surface (120, 220) and the right air bearing surface (130, 230); and wherein
   a trailing edge of the magnetic head is formed from a first material that is different from a second material of the disk facing surface.

2. The magnetic head in accordance with claim 1, wherein a trailing formation protruding from the disk facing surface is formed from a portion of both the first and second materials.

3. The magnetic head in accordance with claim 2, wherein the second material is stiffer than the first material.

4. The magnetic head in accordance with claim 2, wherein one of a terminal edge (149, 249) of the left side rail and a terminal edge (159, 259) of the right side rail is rounded.

5. The magnetic head in accordance with claim 1, wherein a surface of one of the left side rail (140, 240) and the right side rail (150, 250) is offset from a planar surface of one the air bearing surfaces at a depth of 80 to 300 nm.

6. The magnetic head in accordance with claim 1, wherein a surface of the recessed portion (190, 290) is offset from a planar surface of one of the air bearing surfaces at a depth of 1 to 5 $\mu$m.

7. The magnetic head in accordance with claim 1, wherein one of a terminal edge (149, 249) of the left side rail (140, 240) and a terminal edge (159, 259) of the right side rail (150, 250) is aligned with and terminated at a leading edge (182, 282) of the trailing edge (180, 280).

8. A head gimbal assembly (HGA), comprising:
   a suspension;
   a magnetic head attached to the suspension; wherein the magnetic head comprises:
   a disk facing surface;
   a left side rail (140, 240) formed on the disk facing surface (100, 200) in a protruded manner;
   a right side rail (150, 250) formed on the disk facing surface (100, 200) in a protruded manner;
   a cross rail (110, 210) formed on the disk facing surface (100, 200) in a protruded manner and elongated continuously to both the left side rail (140, 240) and the right side rail (150, 250);
   a left air bearing surface (120, 220) formed on the disk facing surface (100, 200) in a protruded manner and formed only on a side of a leading edge (102, 202) continuously from the left side rail, the left air bearing surface (120, 220) having a continuous portion (124, 225) to the left side rail;
   a right air bearing surface (130, 230) formed on the disk facing surface (100, 200) in a protruded manner and formed only on a side of a leading edge (102, 202) continuously from the right side rail, the right air bearing surface (130, 230) having a continuous portion (134, 235) to the right side rail; wherein
   a recessed portion (190, 290) is constructed so as to be surrounded by the left side rail (140, 240), the left air bearing surface (120, 220), the cross rail (110, 210), the right air bearing surface (130, 230), and the right side rail (150, 250), and at least one part of the recessed portion produces negative pressure; and wherein
   one of the left side rail (140, 240) and the right side rail (150, 250) protrude more than the recessed portion (190, 290), and protrude less than one of the left air bearing surface (120, 220) and the right air bearing surface (130, 230); and wherein
   a trailing edge of the magnetic head is formed from a first material that is different from a second material of the disk facing surface.

9. The head gimbal assembly in accordance with claim 8, wherein a trailing formation, protruding from the disk facing surface, is formed from a portion of both the first and second materials.

10. The head gimbal assembly in accordance with claim 9, wherein the first material is alumina and is not as stiff as the second material.

11. The head gimbal assembly in accordance with claim 8, wherein one of a terminal edge (149, 249) of the left side rail (140, 240) and a terminal edge (159, 259) of the right side rail (150, 250) is aligned with and terminated at a leading edge (182, 282) of the trailing edge (180, 280).

12. The head gimbal assembly in accordance with claim 8, wherein a surface of one of the left side rail (140, 240) and the right side rail (150, 250) is offset from a planar surface of one of the air bearing surfaces at a depth of 80 to 300 nm.

13. The head gimbal assembly in accordance with claim 8, wherein a surface of the recessed portion (190, 290) is offset from a planar surface of one of the air bearing surfaces at a depth of 1 to 5 $\mu$m.

14. A head suspension assembly (HSA), comprising:
   a head gimbal assembly (HGA) having a suspension;
   a magnetic head attached to the suspension; wherein the magnetic head comprises:
   a disk facing surface;
   a left side rail (140, 240) formed on the disk facing surface (100, 200) in a protruded manner;
   a right side rail (150, 250) formed on the disk facing surface (100, 200) in a protruded manner;
   a cross rail (110, 210) formed on the disk facing surface (100, 200) in a protruded manner and elongated continuously to both the left side rail (140, 240) and the right side rail (150, 250);
   a left air bearing surface (120, 220) formed on the disk facing surface (100, 200) in a protruded manner and formed only on a side of a leading edge (102, 202) continuously from the left side rail, the left air bearing surface (120, 220) having a continuous portion (124, 225) to the left side rail;
   a right air bearing surface (130, 230) formed on the disk facing surface (100, 200) in a protruded manner and formed only on a side of a leading edge (102, 202) continuously from the right side rail, the right air bearing surface (130, 230) having a continuous portion (134, 235) to the right side rail; wherein
   a recessed portion (190, 290) is constructed so as to be surrounded by the left side rail (140, 240), the left air bearing surface (120, 220), the cross rail (110, 210), the right air bearing surface (130, 230), and the right side rail (150, 250), and at least one part of the recessed portion produces negative pressure; and wherein
   one of the left side rail (140, 240) and the right side rail (150, 250) protrude more than the recessed portion (190, 290), and protrude less than one of the left air bearing surface (120, 220) and the right air bearing surface (130, 230); and wherein
   a trailing edge of the magnetic head is formed from a first material that is not as stiff as a second material of the disk facing surface.

15. The head suspension assembly in accordance with claim 14, wherein a trailing formation, protruding from the disk facing surface and having a third air bearing surface, is formed from a portion of both the first and second materials.

16. The head suspension assembly in accordance with claim 15, wherein the first material is alumina.

17. The head suspension assembly in accordance with claim 16, wherein one of a terminal edge (149, 249) of the left side rail (140, 240) and a terminal edge (159, 259) of the right side rail (150, 250) is aligned with and terminated at a leading edge (182, 282) of the alumina (180, 280).

18. The head suspension assembly in accordance with claim 14, wherein a surface of one of the left side rail (140, 240) and the right side rail (150, 250) is offset from a surface of one of the air bearing surfaces at a depth of 80 to 300 nm.

19. The head suspension assembly in accordance with claim 14, wherein a surface of the recessed portion (190, 290) is offset from a planar surface of one of the air bearing surfaces at a depth of 1 to 5 $\mu$m.

20. A hard disk drive (HDD), comprising:
   a head suspension assembly (HSA) having a head gimbal assembly (HGA) with a suspension;
   a magnetic head attached to the suspension; wherein the magnetic head comprises:
   a disk facing surface formed from a material other than alumina;
   a left side rail (140, 240) formed on the disk facing surface (100, 200) in a protruded manner;
   a right side rail (150, 250) formed on the disk facing surface (100, 200) in a protruded manner;
   a cross rail (110, 210) formed on the disk facing surface (100, 200) in a protruded manner and elongated continuously to both the left side rail (140, 240) and the right side rail (150, 250);
   a trailing portion formed from alumina and having less stiffness than the disk facing surface, the trailing portion being located along a trailing edge of the magnetic head and having a protruding element;
   a left air bearing surface (120, 220) formed on the disk facing surface (100, 200) in a protruded manner and formed only on a side of a leading edge (102, 202) continuously from the left side rail, the left air bearing surface (120, 220) having a continuous portion (124, 225) to the left side rail;
   a right air bearing surface (130, 230) formed on the disk facing surface (100, 200) in a protruded manner and formed only on a side of a leading edge (102, 202) continuously from the right side rail, the right air bearing surface (130, 230) having a continuous portion (134, 235) to the right side rail;
   a trailing air bearing surface formed on the disk facing surface in a protruded manner adjacent to the trailing portion; wherein
   a recessed portion (190, 290) is constructed so as to be surrounded by the left side rail (140, 240), the left air bearing surface (120, 220), the cross rail (110, 210), the right air bearing surface (130, 230), and the right side rail (150, 250), and at least one part of the recessed portion produces negative pressure; and wherein
   one of the left side rail (140, 240) and the right side rail (150, 250) protrude more than the recessed portion (190, 290), and protrude less than one of the left air bearing surface (120, 220) and the right air bearing surface (130, 230).

* * * * *